United States Patent
Imamura

(10) Patent No.: US 11,106,217 B2
(45) Date of Patent: Aug. 31, 2021

(54) AUTOMATED DRIVING INTEGRATED CONTROL APPARATUS, AUTOMATED DRIVING INTEGRATED CONTROL SYSTEM, AND VEHICLE CONTROL APPARATUS

(71) Applicant: SUBARU CORPORATION, Tokyo (JP)

(72) Inventor: Naohiro Imamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 280 days.

(21) Appl. No.: 16/269,720

(22) Filed: Feb. 7, 2019

(65) Prior Publication Data

US 2019/0302797 A1    Oct. 3, 2019

(30) Foreign Application Priority Data

Mar. 29, 2018  (JP) .............................. JP2018-064127

(51) Int. Cl.
*G05D 1/02* (2020.01)

(52) U.S. Cl.
CPC .......... *G05D 1/0276* (2013.01); *G05D 1/0217* (2013.01); *G05D 1/0223* (2013.01); *G05D 1/0287* (2013.01)

(58) Field of Classification Search
CPC ... G05D 1/0276; G05D 1/0223; G05D 1/0287
See application file for complete search history.

(56) References Cited

U.S. PATENT DOCUMENTS

| 2013/0116909 A1 | 5/2013 | Shida |
| 2014/0012449 A1 | 1/2014 | Arita |
| 2017/0068245 A1* | 3/2017 | Scofield ............... G06Q 20/102 |

(Continued)

FOREIGN PATENT DOCUMENTS

| JP | 2010-167877 | 8/2010 |
| JP | 2010-188904 A | 9/2010 |

(Continued)

OTHER PUBLICATIONS

Office Action for JP Patent Application No. 2018-064127, dated Jul. 16, 2019, 03 pages of Office Action and 04 pages of English Translation.

*Primary Examiner* — Peter D Nolan
*Assistant Examiner* — Mikko Okechukwu Obioha
(74) *Attorney, Agent, or Firm* — Chip Law Group

(57) ABSTRACT

An automated driving integrated control apparatus includes: a server side reception processer; a command value calculator; and a server side transmission processer. The server side reception processer receives a vehicle information including at least an information of a current position and an information of a brake specific fuel consumption or a brake specific power consumption from a vehicle. The command value calculator obtains a driving force reference value on a basis of at least the information of the brake specific fuel consumption or the brake specific power consumption in the received vehicle information, and calculates an acceleration command value for an automated driving on a basis of the driving force reference value. The server side transmission processer transmits the calculated acceleration command value to each vehicle.

14 Claims, 7 Drawing Sheets

(56) References Cited

U.S. PATENT DOCUMENTS

| | | | | |
|---|---|---|---|---|
| 2017/0197626 | A1* | 7/2017 | Jammoussi | G08G 1/22 |
| 2017/0276492 | A1* | 9/2017 | Ramasamy | G08G 1/096758 |
| 2018/0211546 | A1* | 7/2018 | Smartt | G05D 1/0088 |
| 2019/0184959 | A1* | 6/2019 | Cao | G06K 9/00362 |
| 2019/0338849 | A1* | 11/2019 | Chunodkar | B60W 10/06 |
| 2020/0307621 | A1* | 10/2020 | Ostrowski | G07C 5/0808 |
| 2020/0410415 | A1* | 12/2020 | Harris | G06Q 10/0635 |

FOREIGN PATENT DOCUMENTS

| | | |
|---|---|---|
| JP | 2012-030665 A | 2/2012 |
| JP | 2014-013522 A | 1/2014 |

\* cited by examiner

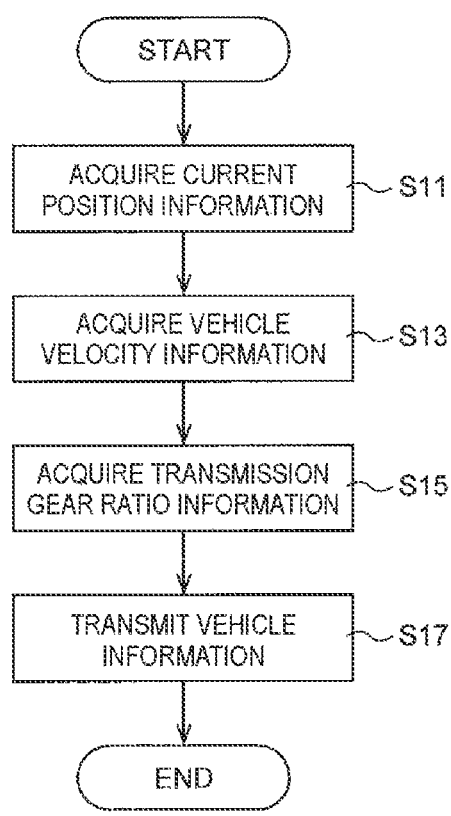

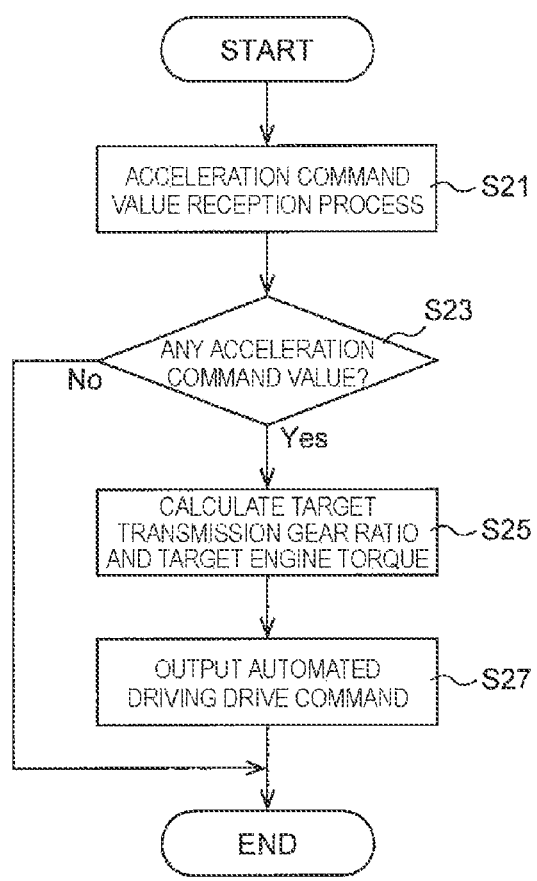

AUTOMATED DRIVING INTEGRATED CONTROL APPARATUS, AUTOMATED DRIVING INTEGRATED CONTROL SYSTEM, AND VEHICLE CONTROL APPARATUS

CROSS-REFERENCE TO RELATED APPLICATIONS

The present application claims priority from Japanese Patent Application No. 2018-064127 filed on Mar. 29, 2018, the entire contents of which are hereby incorporated by reference.

BACKGROUND

1. Technical Field

The present invention relates to an automated driving integrated control apparatus, an automated driving integrated control system, and a vehicle control apparatus.

2. Related Art

Conventionally, a variety of techniques have been proposed to assist in driving automobiles. For instance, Japanese Unexamined Patent Application Publication No. 2010-167877 discloses a driving assist apparatus for a vehicle which uses vehicle-to-vehicle communication to allow a vehicle to travel in a traveling pattern in which less fuel is consumed.

SUMMARY OF THE INVENTION

An aspect of the present invention provides an automated driving integrated control apparatus including: a server side reception processer configured to receive a vehicle information including at least an information of a current position and an information of a brake specific fuel consumption or a brake specific power consumption from a vehicle; a command value calculator configured to obtain a driving force reference value on a basis of at least the information of the brake specific fuel consumption or the brake specific power consumption in the received vehicle information, and calculate an acceleration command value for an automated driving on a basis of the driving force reference value; and a server side transmission processer configured to transmit the calculated acceleration command value to each vehicle.

An aspect of the present invention provides a vehicle control apparatus including: a vehicle side transmission processor configured to transmit a vehicle information including at least an information of a current position and an information of a brake specific fuel consumption or a brake specific power consumption to an automated driving integrated control apparatus via a wireless communication mechanism; a vehicle side reception processor configured to receive an acceleration command value from the automated driving integrated control apparatus; and a drive controller configured to control a driving force of a vehicle on a basis of the received acceleration command value.

An aspect of the present invention provides an automated driving integrated control system including: an automated driving integrated control apparatus configured to receive a vehicle information including at least an information of a current position and an information of a brake specific fuel consumption or a brake specific power consumption from a vehicle, obtain a driving force reference value on a basis of at least the information of the brake specific fuel consumption or the brake specific power consumption in the received vehicle information, calculate an acceleration command value for an automated driving on a basis of the driving force reference value, and transmit the calculated acceleration command value to each vehicle; and a vehicle control apparatus configured to transmit the vehicle information to the automated driving integrated control apparatus via a wireless communication mechanism, receive the acceleration command value from the automated driving integrated control apparatus, and control a driving force of the vehicle on a basis of the received acceleration command value.

An aspect of the present invention provides an automated driving integrated control apparatus including circuitry. The circuitry is configured to receive a vehicle information comprising at least an information of a current position and an information of a brake specific fuel consumption or a brake specific power consumption from a vehicle. The circuitry is configured to obtain a driving force reference value on a basis of at least the information of the brake specific fuel consumption or the brake specific power consumption in the received vehicle information, and calculate an acceleration command value for an automated driving on a basis of the driving force reference value. The circuitry is configured to transmit the calculated acceleration command value to each vehicle.

An aspect of the present invention provides a vehicle control apparatus including circuitry. The circuitry is configured to transmit a vehicle information comprising at least an information of a current position and an information of a brake specific fuel consumption or a brake specific power consumption to an automated driving integrated control apparatus via a wireless communication mechanism. The circuitry is configured to receive an acceleration command value from the automated driving integrated control apparatus. The circuitry is configured to control a driving force of a vehicle on a basis of the received acceleration command value.

BRIEF DESCRIPTION OF THE DRAWINGS

FIG. 7 is a flowchart specifically illustrating a process of transmitting vehicle information by the onboard control apparatus according to the example; and FIG. 8 is a flowchart specifically illustrating a process of executing a drive control over a vehicle by the onboard control apparatus according to the example.

DETAILED DESCRIPTION

Figure 1:
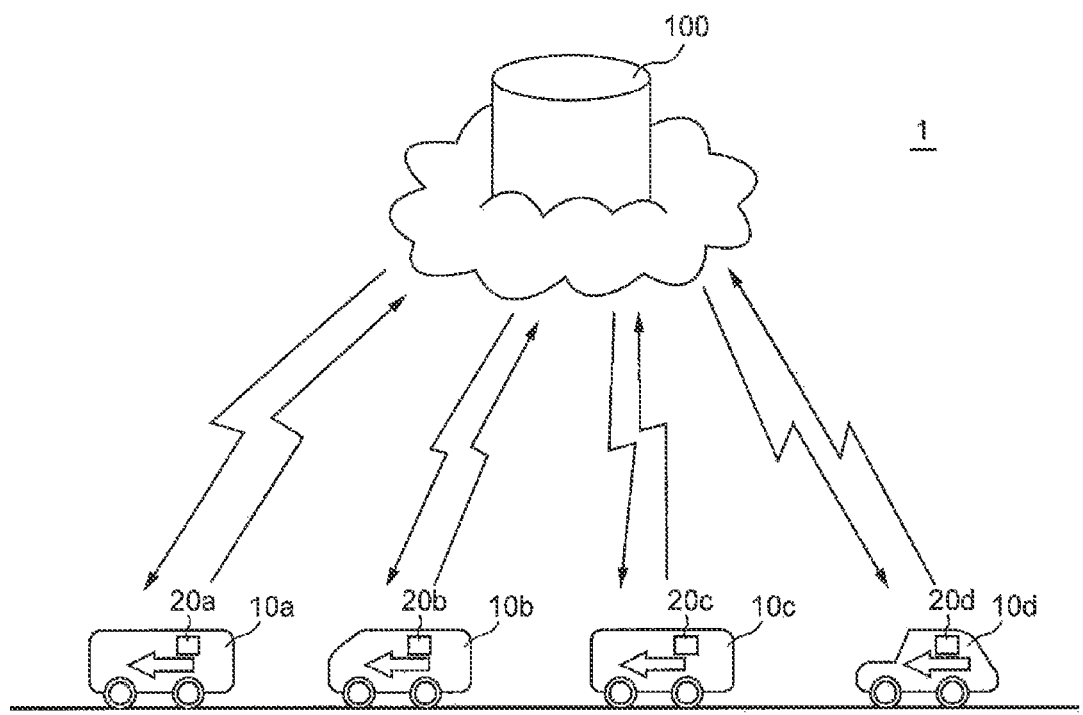
FIG. 1 is a schematic diagram illustrating a configuration example of an automated driving integrated control system according to an example of the present invention.

Hereinafter, preferred examples of the present invention will be described in detail with reference to the appended drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted.

The performance of automobiles such as the outputs of the engines and the vehicle weight of the automobiles varies according to each automobile. In addition, a method for driving an automobile such as how much or when to step on the accelerator pedal and the brake pedal is also different for each driver. Therefore, the respective automobiles have different movement beginning timing or acceleration. Especially in a situation in which there are a large number of cars, a difference between these cars in movement beginning timing or acceleration can cause traffic congestion. In addition, in such a situation, each car is supposed to undergo drive control in a driving area with high specific fuel consumption, so that the total amount of fuel consumed by all cars can increase.

In contrast, if automated driving control can be performed to allow all the cars to begin to move, accelerate, and stop at the same timing, it is possible to avoid traffic congestion. It is of significance to suppress the total amount of fuel consumed by all the cars even in the case where such automated driving control is performed.

It is desirable to provide a novel and improved automated driving integrated control apparatus, automated driving integrated control system, and vehicle control apparatus that can suppress the total amount of fuel consumed by vehicles while performing automated driving control over the vehicles to relieve traffic congestion.

<1. Automated Driving Integrated Control System>

The overall configuration of an automated driving integrated control system according to the present example will be described. FIG. 1 is a schematic diagram schematically illustrating the configuration of an automated driving integrated control system 1. Note that the present example adopts and describes, as an instance, the case where a vehicle is a vehicle that uses an internal combustion engine as the driving source.

The automated driving integrated control system 1 includes vehicle control apparatuses (which will also be referred to as "onboard control apparatuses" below) 20a to 20d mounted on respective vehicles 10a to 10d, and an automated driving integrated control apparatus (which will also be referred to simply as "integrated control apparatus" below) 100.

The integrated control apparatus 100 is, for instance, a cloud server, and is capable of performing wireless communication with the onboard control apparatuses 20a to 20d.

In the automated driving integrated control system 1, the integrated control apparatus 100 receives vehicle information from the respective onboard control apparatuses 20a to 20d, and obtains a driving force reference value on the basis of the information of the brake specific fuel consumption (BSFC) (g/kwh) included in the vehicle information. In addition, the integrated control apparatus 100 calculates an acceleration command value Acc_tgt common to all the vehicles 10a to 10d on the basis of the driving force reference value. The integrated control apparatus 100 transmits the calculated acceleration command value Acc_tgt to the respective onboard control apparatuses 20a to 20d. The onboard control apparatuses 20a to 20d control the driving force of the respective vehicles 10a to 10d in accordance with the received acceleration command value Acc_tgt.

In this way, in the automated driving integrated control system 1, the driving force of the respective vehicles 10a to 10d is controlled in accordance with the acceleration command value Acc_tgt set by the integrated control apparatus 100, and automated driving control is performed over the respective vehicles 10a to 10d. This allows the respective vehicles 10a to 10d to agree with each other as to movement beginning timing or stop timing, or acceleration, and it is possible to prevent traffic congestion from occurring. At that time, control is performed to decrease the overall BSFC of all the vehicles 10a to 10d, and it is possible to suppress the total amount of fuel consumed by all the vehicles 10a to 10d.

The following describes configuration examples and operation examples of the integrated control apparatus 100 and the respective onboard control apparatuses 20a to 20d. Note that, in the case where there is no need to distinguish between the vehicles 10a to 10d or the onboard control apparatuses 20a to 20d, the following description generically refers them as vehicle(s) 10 or onboard control apparatus(es) 20.

<2. Automated Driving Integrated Control Apparatus>

The integrated control apparatus 100 calculates the acceleration command value Acc_tgt common to the vehicles 10a to 10d while performing wireless communication with the onboard control apparatuses 20, and transmits the calculated acceleration command value Acc_tgt to the respective vehicles 10a to 10d. Part or the whole of the integrated control apparatus 100 may include, for instance, a microcomputer, a microprocessor unit or the like, and also include what can be updated such as firmware. In addition, part or the whole of the integrated control apparatus 100 may be a program module or the like that is executed in accordance with a command from a central processing unit (CPU) or the like.

(2-1. Configuration of Automated Driving Integrated Control Apparatus)

Figure 2:
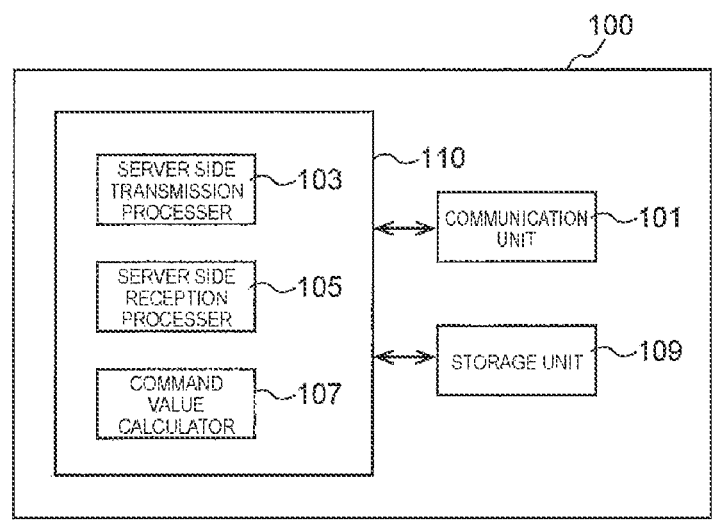
FIG. 2 is a block diagram illustrating a configuration example of an integrated control apparatus according to the example.

FIG. 2 is a block diagram illustrating a configuration example of the integrated control apparatus 100. The integrated control apparatus 100 includes a communication unit 101, a server side transmission processer 103, a server side reception processer 105, a command value calculator 107, and a storage unit 109. Among them, the server side transmission processer 103, the server side reception processer 105, and the command value calculator 107 are functions that are achieved by executing software programs by a controller 110 such as a microcomputer.

(Communication Unit)

The communication unit 101 is an interface for transmitting and receiving information to and from the onboard control apparatuses 20a to 20d through wireless communication.

(Storage Unit)

The storage unit 109 stores a software program, a calculation parameter, a calculation result, acquired data, and the like. The storage unit 109 may include, for instance, at least one storage apparatus among a CD-ROM, an HDD, a storage, or the like. In addition, the storage unit 109 may include a storage element such as a random access memory (RAM) or a read only memory (ROM).

(Server Side Reception Processer)

The server side reception processer 105 performs a process of receiving vehicle information from the onboard control apparatuses 20a to 20d of the respective vehicles 10a to 10d. The vehicle information includes at least the information of the current positions and the information of the BSFC of the vehicles 10a to 10d. The information of the BSFC is map information that is created, for instance, for each of the vehicles 10a to 10d on the basis of the characteristics of the engine. In the present example, the vehicle information includes the information of the current vehicle velocity, the information of the current transmission gear ratios, the information of the shift lines, the information of the tire diameters, the information of the vehicle weight, and the information of the output characteristics of the engines of the respective vehicles 10a to 10d in addition to the information of the current positions and the information of the BSFC.

The server side reception processer 105 may perform a reception process, for instance, whenever the onboard control apparatuses 20a to 20d transmit vehicle information, or perform a reception process in each predetermined process cycle. Alternatively, the server side reception processer 105 may transmit transmission requests for vehicle information to the onboard control apparatuses 20a to 20d in each predetermined process cycle, and receive vehicle information transmitted from the onboard control apparatuses 20a to 20d.

(Command Value Calculator)

The command value calculator 107 calculates the acceleration command value Acc_tgt for automated driving on the basis of vehicle information received from the onboard control apparatuses 20a to 20d mounted on the vehicles 10a to 10d. In the present example, the command value calculator 107 obtains a driving force reference value P_base on the basis of at least the information of BSFC in the received vehicle information, and calculates the acceleration command value Acc_tgt for automated driving on the basis of the driving force reference value P_base.

The command value calculator 107 may calculate the acceleration command value Acc_tgt for automated driving in the case where a condition for executing automated driving control is satisfied. The execution condition of automated driving control may be, for instance, a condition about whether a preset number or a larger number of vehicles that are automated driving control targets travel tandem in a row. Executing automated driving control when such a condition is satisfied increases the advantageous effects of preventing traffic congestion from occurring. It is possible to determine on the basis of the information of the current positions of the respective vehicles 10a to 10d which is included in the vehicle information whether such a condition is satisfied.

Alternatively, the execution condition of automated driving control may be a condition about whether the ratio of vehicles to which the automated driving integrated control system 1 is applicable among vehicles traveling in a predetermined section is a preset ratio or higher. Executing automated driving control when such a condition is satisfied makes it possible to control the flow of vehicles and prevent traffic congestion from occurring even in the case where vehicles that are not targets of the automated driving control are mixed. It is possible to determine whether such a condition is satisfied, for instance, by performing communication between the integrated control apparatus 100 and all the vehicles, and determining whether they are vehicles that are targets of the automated driving control.

(Server Side Transmission Processer)

The server side transmission processer 103 transmits the calculated acceleration command value Acc_tgt to the onboard control apparatuses 20a to 20d of the respective vehicles 10a to 10d. The server side transmission processer 103 may transmit the acceleration command value Acc_tgt to the onboard control apparatus 20, for instance, in each predetermined process cycle.

(2-2. Operation)

Next, the processing operation of the integrated control apparatus 100 will be described in detail.

Figure 3:
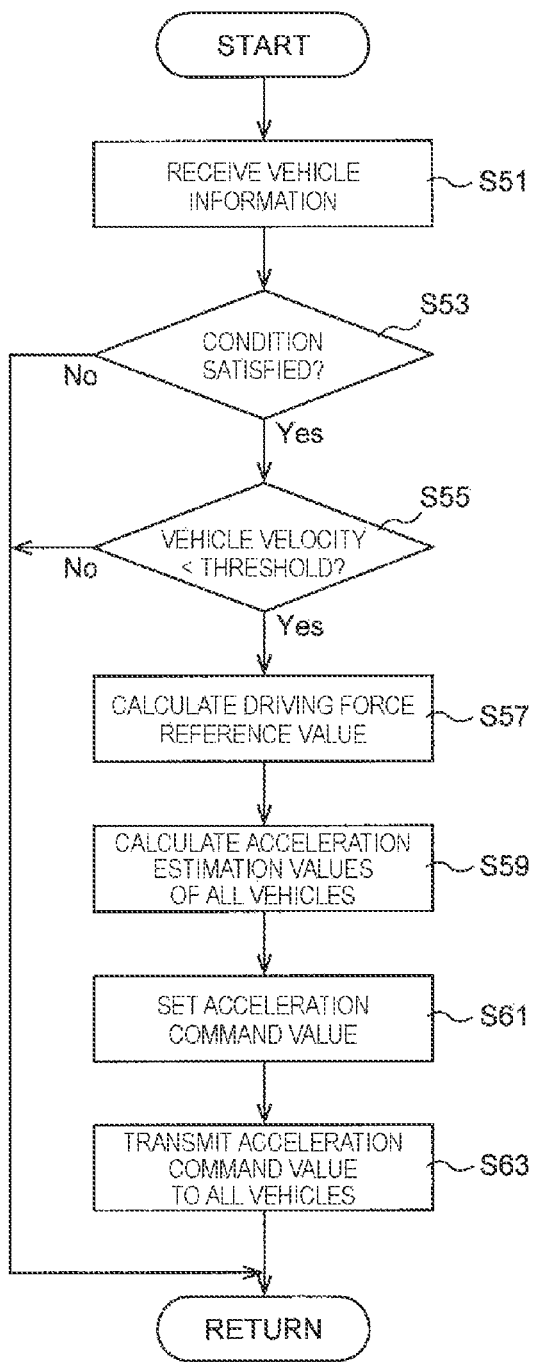
FIG. 3 is a flowchart illustrating a processing operation of the integrated control apparatus according to the example.

FIG. 3 is a flowchart illustrating the processing operation of the integrated control apparatus 100. The integrated control apparatus 100 may execute the flowchart, for instance, in each predetermined process cycle.

First, the server side reception processer 105 of the integrated control apparatus 100 receives vehicle information from the onboard control apparatuses 20a to 20d mounted on the respective vehicles 10a to 10d (step S51). The received vehicle information includes at least the information of the current positions and the information of the BSFC of the respective vehicles 10a to 10d. In the present example, the vehicle information also includes the information of the current vehicle velocity, the information of the current transmission gear ratios, the information of the shift lines, the information of the tire diameters, the information of the vehicle weight, and the information of the output characteristics of the engines of the respective vehicles 10a to 10d in addition to the information of the current positions and the information of the BSFC.

Next, the command value calculator 107 of the integrated control apparatus 100 determines whether an execution condition of automated driving control is satisfied (step S53). The command value calculator 107 may determine, as the execution condition of automated driving control, for instance, a traveling state of a vehicle that is an automated driving control target. For instance, the command value calculator 107 may determine on the basis of the information of the current vehicle velocity whether the vehicle is stopped or traveling.

In addition, the command value calculator 107 may determine, as the execution condition of automated driving control, for instance, whether a preset number or a larger number of vehicles that are automated driving control targets are traveling in a row. Executing automated driving control when such a condition is satisfied increases the advantageous effects of preventing traffic congestion from occurring. The command value calculator 107 may determine as the execution condition of automated driving control whether the ratio of vehicles to which the automated driving integrated control system 1 is applicable among vehicles traveling in a predetermined section is a preset ratio or higher. It is possible to determine on the basis of the information of the current positions of the respective vehicles 10 which is included in the vehicle information whether such a condition is satisfied.

In the case where the execution condition of automated driving control is not satisfied (S53/No), the command value calculator 107 terminates the routine for this time without setting the acceleration command value Acc_tgt. In contrast, in the case where the execution condition of automated driving control is satisfied (S53/Yes), the command value calculator 107 determines whether the current vehicle velocity of the vehicle that is an automated driving control target is less than a predetermined threshold (step S55). The threshold may be, for instance, the limit speed of a driving lane in which the vehicle is currently traveling, or speed at which there is no longer considered to be any possibility of traffic congestion.

In the case where the current vehicle velocity reaches the predetermined threshold (S55/No), the command value calculator 107 terminates the routine for this time without setting the acceleration command value Acc_tgt. In contrast, in the case where the current vehicle velocity is less than the predetermined threshold (S55/Yes), the command value calculator 107 calculates the driving force reference value P_base on the basis of at least the information of the BSFC in the received vehicle information (step S57). In the present example, the command value calculator 107 calculates an engine output as the driving force reference value P_base.

For instance, the command value calculator 107 calculates a common engine output that minimizes the sum of the BSFC of the respective vehicles 10a to 10d with reference to the map information of the BSFC of the respective vehicles 10a to 10d.

Figure 4:
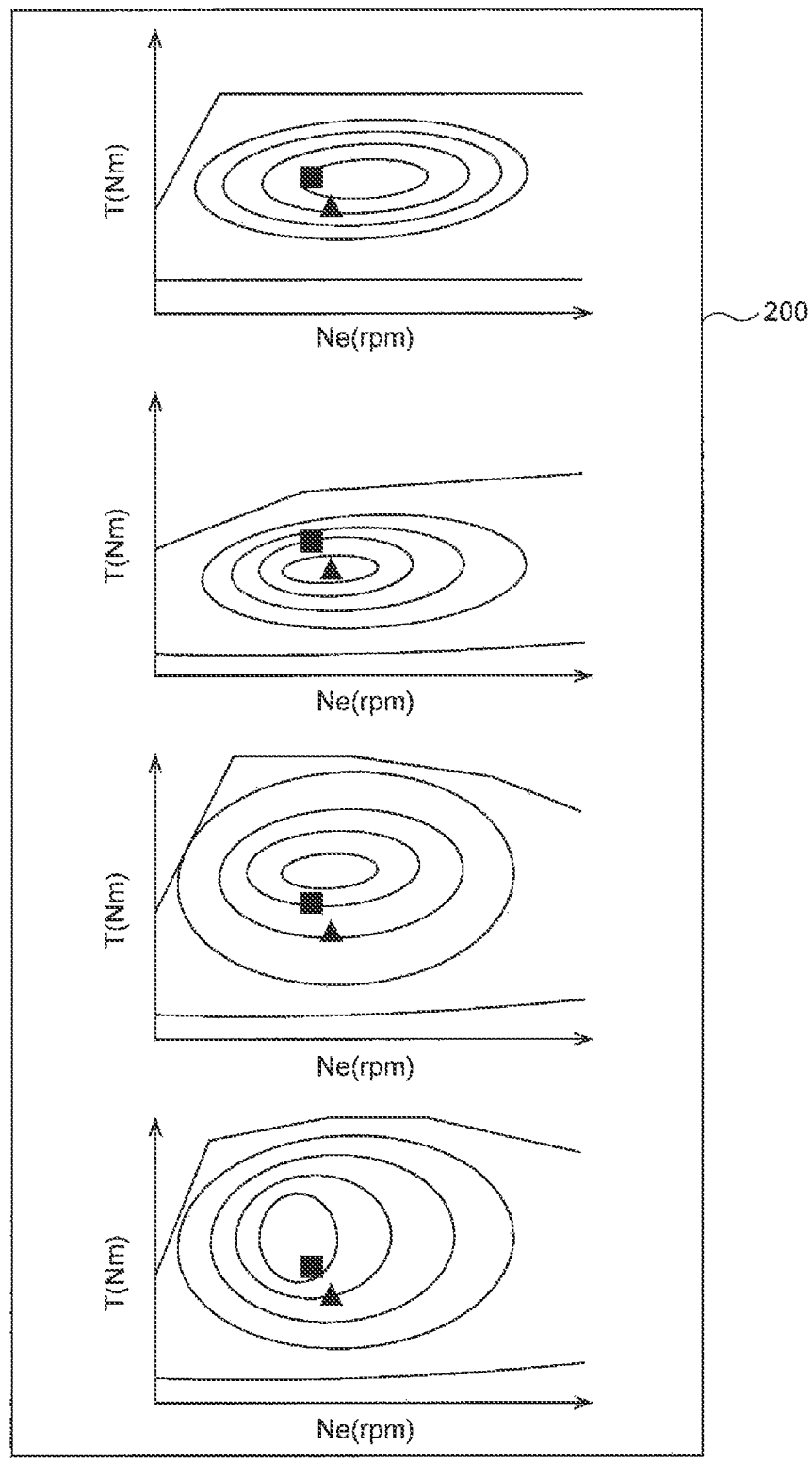
FIG. 4 is an instance of a BSFC map group of four different vehicles.

FIG. 4 illustrates an instance of a BSFC map group 200 of four different vehicles. The horizontal axis of each BSFC map represents engine rotation speed Ne (rpm), and the vertical axis represents engine torque Te (Nm). In addition, a contour line is illustrated for brake specific fuel consumption in each BSFC map, and the brake specific fuel consumption has a smaller value toward the center.

The command value calculator 107 obtains an engine output (kw) (Ne×Te) that minimizes the sum of the BSFC (g/kwh) of the respective vehicles 10a to 10d on the basis of the received BSFC maps of the vehicles 10a to 10d. For instance, the command value calculator 107 may obtain the sum of the BSFC of all the vehicles 10a to 10d while changing the engine rotation speed Ne and the engine torque Te, and obtain such a combination of engine rotation speed Ne_base and engine torque Te_base that minimizes the sum of the BSFC. In the instance of the BSFC map group 200 illustrated in FIG. 4, the driving force reference value (engine output) P_base that minimizes the sum of the BSFC is represented as a square mark (■).

Note that a method for calculating the driving force reference value P_base is not limited to the instance described above. For instance, an engine output that minimizes the BSFC of a vehicle with the smallest maximum output of the engine among the vehicles 10a to 10d that are transmission sources of the received vehicle information may be set as the driving force reference value P_base. In the instance of the BSFC map group 200 illustrated in FIG. 4, the driving force reference value (engine output) P_base that minimizes the BSFC of a vehicle with the smallest maximum output of the engine is represented as a triangle mark (▲).

FIG. 3 will be referred to again. Next, the command value calculator 107 calculates acceleration estimation values Acc_est of the respective vehicles 10a to 10d on the basis of the calculated driving force reference value P_base (step S59). For instance, the command value calculator 107 uses the following expression (1) to calculate the acceleration estimation values Acc_est in the case where the respective vehicles 10a to 10d are driven at the driving force reference value P_base.

$$Acc\_est = Te\_base \times Rg/Rt/W \quad (1)$$

Acc_est: acceleration estimation value (m/s²)
Te_base: engine torque (Nm)
Rg: transmission gear ratio
Rt: tire diameter (m)
W: vehicle weight (kg)

The value of the engine torque Te_base used here is the engine torque Te_base that is an element of the driving force reference value P_base calculated in step S57. In addition, the transmission gear ratio Rg is a transmission gear ratio corresponding to a shift line (gear ratio/transmission gear ratio) that passes through the driving force reference value P_base which minimizes the sum of the BSFC of the respective vehicles 10a to 10d.

Next, the command value calculator 107 sets the smallest value among all the calculated acceleration estimation values Acc_est as the acceleration command value Acc_tgt (step S61). The set acceleration command value Acc_tgt is the acceleration command value Acc_tgt for automated driving which is common to all the vehicles 10a to 10d, and is set on the basis of the driving force reference value P_base that minimizes the sum of the BSFC of all the vehicles 10a to 10d. The acceleration command value Acc_tgt is used to control the driving force of all the vehicles 10a to 10d, thereby making it possible to reduce the total amount of fuel consumed by all the vehicles 10a to 10d.

Note that, even in the case where the acceleration command value Acc_tgt is set in a similar procedure on the basis of the driving force reference value (engine output) P_base that minimizes the BSFC of the vehicle with the smallest maximum output of the engine, the total amount of fuel consumed by all the vehicles 10a to 10d can be reduced.

Next, the server side transmission processer 103 of the integrated control apparatus 100 transmits the calculated acceleration command value Acc_tgt to the onboard control apparatuses 20a to 20d of all the vehicles 10a to 10d (step S63).

The integrated control apparatus 100 repeatedly executes the processes of steps S51 to S63 described above. This causes the acceleration command value Acc_tgt common to the vehicles 10a to 10d to be calculated on the basis of vehicle information received from the vehicles 10a to 10d, and causes the calculated acceleration command value Acc_tgt to be transmitted to the respective vehicles 10a to 10d. Thus, the vehicles 10a to 10d that are automated driving control targets can agree with each other so as to movement beginning timing or stop timing, and acceleration, and it is possible to prevent traffic congestion from occurring, and reduce the total amount of fuel consumed by all the vehicles 10a to 10d.

<3. Onboard Control Apparatus (Vehicle Control Apparatus)>

The onboard control apparatuses 20a to 20d are mounted on the respective vehicles 10a to 10d, receive the acceleration command value Acc_tgt while performing wireless communication with the integrated control apparatus 100, and control the driving force of the vehicles 10a to 10d on the basis of the received acceleration command value Acc_tgt. Some or all of the onboard control apparatuses 20a to 20d may include, for instance, microcomputers, microprocessor units or the like, and also include what can be updated such as firmware. In addition, some or all of the respective onboard control apparatuses 20a to 20d may be program modules or the like that are executed in accordance with a command from the CPU and the like. In addition, the respective onboard control apparatuses 20a to 20d may include one control unit, or control units that can communicate with each other.

(3-1. Configuration of Vehicle Control Apparatus)

Figure 5:
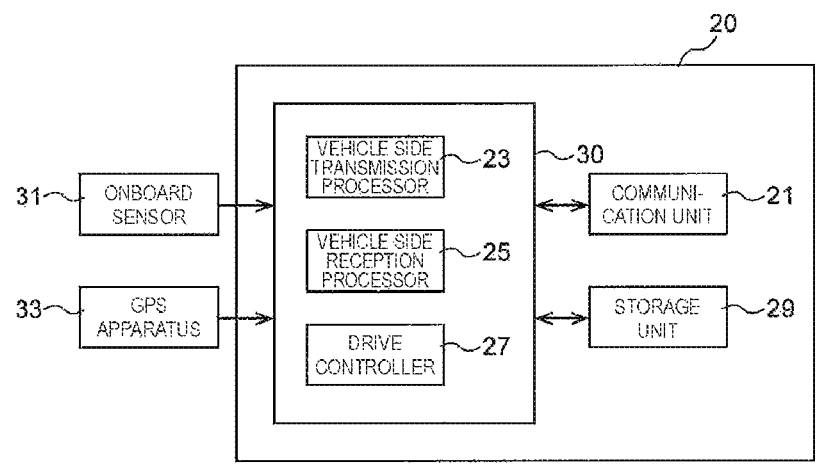
FIG. 5 is a block diagram illustrating a configuration example of an onboard control apparatus according to the example.

FIG. 5 is a block diagram illustrating a configuration example of the onboard control apparatus 20. The onboard control apparatus 20 includes a communication unit 21, a vehicle side transmission processor 23, a vehicle side reception processor 25, a drive controller 27, and a storage unit 29. Among them, the vehicle side transmission processor 23, the vehicle side reception processor 25, and the drive controller 27 are functions that are achieved by executing software programs by a controller 30 such as a microcomputer. The controller 30 is capable of receiving signals transmitted from one or more onboard sensors 31 such as vehicle velocity sensors and a global positioning system (GPS) apparatus 33.

(Communication Unit)

The communication unit 21 is an interface for transmitting and receiving information to and from the integrated control apparatus 100 through wireless communication.

(Storage Unit)

The storage unit 29 stores a software program, a calculation parameter, a calculation result, acquired data, and the like. The storage unit 29 may include, for instance, a storage element such as a RAM or a ROM. In addition, the storage unit 29 may include a storage apparatus such as an HDD or a storage.

(Vehicle Side Transmission Processor)

The vehicle side transmission processor 23 transmits vehicle information including at least the information of the current position and the information of the BSFC of the vehicle 10 to the integrated control apparatus 100. The information of the current position can be acquired, for instance, by using the GPS apparatus 33 mounted on the vehicle 10. The information of the BSFC is map information that is created, for instance, for each vehicle 10 on the basis of the characteristics of the engine, and stored in the storage unit 29 in advance.

In the present example, the vehicle information includes the information of the current vehicle velocity, the information of the current transmission gear ratios, the information of the shift lines, the information of the tire diameters, the information of the vehicle weight, and the information of the output characteristics of the engines of the vehicles 10 in addition to the information of the current positions and the information of the BSFC. The information of the current vehicle velocity can be acquired, for instance, by using a vehicle velocity sensor. The information of the current transmission gear ratio can be acquired from a transmission control unit (TCU) that controls the operation of a transmission. The information of a shift line, the information of a tire diameter, the information of vehicle weight, and the information of the output characteristics of the engine are stored in the storage unit 29 in advance as the specification information for each vehicle 10.

The vehicle side transmission processor 23 may acquire information necessary as the vehicle information described above, for instance, in each preset process cycle, and transmit the acquired information to the integrated control apparatus 100. Alternatively, the vehicle side transmission processor 23 may acquire the information necessary as the vehicle information described above when receiving a transmission request from the integrated control apparatus 100, and transmit the acquired information to the integrated control apparatus 100.

(Vehicle Side Reception Processor)

The vehicle side reception processor 25 receives the acceleration command value Acc_tgt transmitted from the integrated control apparatus 100. The vehicle side reception processor 25 may receive the acceleration command value Acc_tgt, for instance, in each preset process cycle.

(Drive Controller)

The drive controller 27 controls the driving force of the vehicle 10 on the basis of the received acceleration command value Acc_tgt. In the instance of the present example, the vehicle 10 is a vehicle that uses an internal combustion engine as the driving source, and the drive controller 27 calculates the target transmission gear ratio Rg_tgt and the target engine torque Te_tgt that minimize BSFC on the basis of the received acceleration command value Acc_tgt and transmits a drive command to the transmission control unit (TCU) and the engine control unit (ECU).

(3-2. Operation)

Next, the processing operation of the onboard control apparatus 20 will be described in detail.

Figure 6:
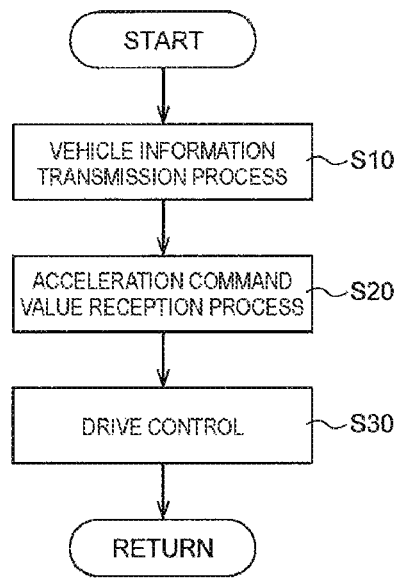
FIG. 6 is a flowchart illustrating a main routine of a processing operation of the onboard control apparatus according to the example.

FIG. 6 is a flowchart illustrating the main routine of the processing operation of the onboard control apparatus 20. The onboard control apparatus 20 may execute the flowchart in each predetermined process cycle, for instance, in automated driving control.

First, the vehicle side transmission processor 23 of the onboard control apparatus 20 executes a process of transmitting vehicle information to the integrated control apparatus 100 (step S10).

FIG. 7 is a flowchart schematically illustrating the process of transmitting vehicle information. The vehicle side transmission processor 23 acquires the information of the current position of the vehicle 10, for instance, from the GPS apparatus 33 mounted on the vehicle 10 (step S11). Next, the vehicle side transmission processor 23 acquires the information of the current vehicle velocity, for instance, detected by the vehicle velocity sensor (step S13). Next, the vehicle side transmission processor 23 acquires the information of the current transmission gear ratio from the TCU (step S15).

Next, the vehicle side transmission processor 23 refers to the information of BSFC, the information of a shift line, the information of a tire diameter, the information of vehicle weight and the information of the output characteristics of the engine stored in the storage unit 29, and transmits vehicle information to the integrated control apparatus 100 via the communication unit 21 along with the information of the current position, the information of the vehicle velocity and the information of the transmission gear ratio (step S17).

FIG. 6 will be referred to again, and the vehicle side reception processor 25 of the onboard control apparatus 20 executes a process of receiving the acceleration command value Acc_tgt from the integrated control apparatus 100 (step S20). Next, the drive controller 27 of the onboard control apparatus 20 executes drive control over the vehicle 10 on the basis of the received acceleration command value Acc_tgt (step S30).

FIG. 8 is a flowchart specifically illustrating a process of receiving the acceleration command value Acc_tgt, and executing drive control of the vehicle 10. The vehicle side reception processor 25 performs a process of receiving the acceleration command value Acc_tgt from the integrated control apparatus 100 via the communication unit 21 (step S21). Next, the drive controller 27 determines whether the acceleration command value Acc_tgt is received (step S23).

In the case where the acceleration command value Acc_tgt is not received (S23/No), the drive controller 27 terminates the present routine without performing automated driving control. In this case, the vehicle 10 controls driving force, for instance, in accordance with an accelerator operation of a driver.

In contrast, in the case where the acceleration command value Acc_tgt is received (S23/Yes), the drive controller 27 calculates the target transmission gear ratio Rg_tgt and the target engine torque Te_tgt of the vehicle 10 on the basis of the acceleration command value Acc_tgt (step S25). The target transmission gear ratio Rg_tgt and the target engine torque Te_tgt at this time are set so as to minimize the BSFC in accordance with the acceleration command value Acc_tgt in each vehicle 10.

For instance, the drive controller 27 may calculate the target transmission gear ratio Rg_tgt and the target engine torque Te_tgt with the following expression (2).

$$Te\_tgt = Acc\_tgt / Rg\_tgt \times Rt \times W \quad (2)$$

Te_tgt: target engine torque (Nm)
Acc_tgt: acceleration command value (m/s$^2$)
Rg_tgt: target transmission gear ratio
Rt: tire diameter (m)
W: vehicle weight (kg)

The target transmission gear ratio Rg_tgt is set so as to change from the transmission gear ratio Rg at the time of beginning to move or the current transmission gear ratio Rg in accordance with a preset shift line. That is, the target transmission gear ratio Rg_tgt is set on the basis of the vehicle velocity and the acceleration command values Acc_tgt of the respective vehicles 10a to 10d with reference to a shift line map. Once the target transmission gear ratio Rg_tgt is set, the target engine torque Te_tgt is set in accordance with the expression (2) described above.

Next, the drive controller 27 respectively transmits the calculated target transmission gear ratio Rg_tgt and target engine torque Te_tgt to the TCU and the ECU as automated driving drive commands (step S27). This causes the TCU to control the gear ratio of the transmission, and causes the ECU to control the engine output. All the vehicles 10 that receive the acceleration command value Acc_tgt are controlled with common acceleration, so that all the vehicle 10 begin to move or stop at the same timing, and travel with the same acceleration. This can prevent traffic congestion from occurring.

<4. Use Instance>

For instance, the following use of the automated driving integrated control system 1 according to the present example can efficiently prevent traffic congestion from occurring.

For instance, the integrated control apparatus 100 may transmit the acceleration command value Acc_tgt for automated driving to the vehicles 10a to 10d traveling in a dedicated lane for automated driving. This causes a vehicle traveling in a lane other than the dedicated lane for automated driving to be excluded from targets of automated driving control. For instance, while the vehicle travels in accordance with a driving operation of a driver, the vehicles 10a to 10d traveling in the dedicated lane for automated driving undergo automated driving control and it is possible to prevent traffic congestion from occurring. It can be determined whether a vehicle is traveling in a dedicated lane for automated driving, for instance, on the basis of the information of the current position which is included in vehicle information to be received.

In addition, the integrated control apparatus 100 may transmit the acceleration command value Acc_tgt for automated driving to the vehicles 10a to 10d traveling in a lane of a preset section as a group of control targets. For instance, the integrated control apparatus 100 may use the vehicles 10a to 10d traveling between traffic lights installed at an intersection or the like as a group of control targets, or use the vehicles 10a to 10d traveling between interchanges or parking areas as a group of control targets. This causes the vehicles 10a to 10d traveling in the same section to undergo automated driving control for each section on the basis of the common acceleration command value Acc_tgt, and it is possible to efficiently prevent traffic congestion from occurring. It can be determined whether a vehicle is traveling in a lane of the section, for instance, on the basis of the information of the current position which is included in vehicle information to be received.

In addition, the integrated control apparatus 100 may transmit the acceleration command value Acc_tgt for automated driving to the vehicles 10a to 10d that are automated driving control targets in a period of time before the vehicles 10a to 10d travel at constant velocity after beginning to move. After the vehicles 10a to 10d travel at constant velocity, traffic congestion is unlikely to occur. Accordingly, performing drive control of the vehicles 10a to 10d in accordance with driving operations by drivers after traveling at constant velocity enables the vehicles to travel with the operation feelings of the drivers reflected therein while preventing traffic congestion from occurring.

<5. Conclusion>

As described above, in the automated driving integrated control system 1 according to the present example, the integrated control apparatus 100 calculates the acceleration command value Acc_tgt that makes the sum of the BSFC of the vehicles 10a to 10d smaller, and transmits the acceleration command value Acc_tgt for automated driving to the respective onboard control apparatuses 20. In addition, the onboard control apparatus 20 that receives the acceleration command value Acc_tgt executes drive control of the vehicles 10a to 10d on the basis of the acceleration command value Acc_tgt. Therefore, it is possible to reduce the total amount of fuel consumed by the vehicles 10a to 10d while preventing traffic congestion from occurring.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For instance, in the example described above, the case where a vehicle is a vehicle that uses an internal combustion engine as the driving source has been described as an instance, but the present invention is not limited to the instance. Even if a vehicle is a hybrid vehicle that uses an internal combustion engine and a motor as driving sources or an electric vehicle that uses a motor as a driving source, the present invention can be applied. In that case, the command value calculator of the integrated control apparatus uses the information of brake specific power consumption for each vehicle in combination with BSFC or instead of BSFC to calculate an acceleration command value.

For instance, in the case where it is a hybrid vehicle alone that is a vehicle which is a control target, it is sufficient if the rotation speed of the motor is controlled further with reference to the information of BSFC on the basis of the gear ratio corresponding to a shift line (gear ratio/transmission gear ratio) that passes through the driving force reference value P_base which minimizes the sum of the BSFC at the time of hybrid traveling in which an internal combustion engine and a motor are used. In addition, in the case where it is an electric vehicle alone that is a vehicle which is a control target, the rotation speed of a motor may be controlled so as to minimize the sum of the brake specific power consumption of vehicles.

Moreover, in the case where a vehicle that uses an internal combustion engine as the driving source and an electric vehicle are mixed as vehicles that are control targets, for instance, the amount of consumed fuel may be preferentially reduced to reduce exhaust gas and the target transmission gear ratios Rg_tgt and the target engine torque Te_tgt of the respective vehicles, and the rotation speed of the motors may be controlled so as to minimize the sum of the BSFC. Alternatively, in the case where the state of charge (SOC) of a secondary battery that supplies power to the motors is less than a predetermined value, the amount of consumed power may be preferentially reduced and the target transmission gear ratios Rg_tgt and the target engine torque Te_tgt of the respective vehicles, and the rotation speed of the motors may be controlled so as to minimize the brake specific power consumption. This makes it possible to prevent traffic congestion from occurring while reducing the total amount of energy consumed by the vehicles.

The invention claimed is:

1. An automated driving integrated control apparatus, comprising:
   a server side reception processor configured to receive vehicle information comprising information of a current position, information of a vehicle velocity, information of a transmission gear ratio, information of a tire diameter, information of a vehicle weight, information of an output characteristic of an engine, and information of at least one of brake specific fuel consumption or brake specific power consumption from each vehicle of a plurality of vehicles;
   a command value calculator configured to:
      obtain a driving force reference value on a basis of at least the information of the at least one of the brake specific fuel consumption or the brake specific power consumption in the received vehicle information; and
      calculate an acceleration command value for an automated driving on a basis of the driving force reference value; and
   a server side transmission processor configured to transmit the calculated acceleration command value to each vehicle of the plurality of vehicles.

2. The automated driving integrated control apparatus according to claim 1, wherein
   the command value calculator is further configured to set, as the driving force reference value, a driving force that minimizes a sum of the brake specific fuel consumption of each vehicle of the plurality of vehicles or the brake specific power consumption of each vehicle consumptions of the plurality of vehicles.

3. The automated driving integrated control apparatus according to claim 1, wherein
   the command value calculator is further configured to set, as the driving force reference value, a driving force that minimizes the brake specific fuel consumption or the brake specific power consumption of a vehicle of the plurality of vehicles with a smallest maximum output of a driving source among the plurality of vehicles.

4. The automated driving integrated control apparatus according to claim 1, wherein the command value calculator is further configured to:
   calculate a plurality of acceleration estimation values for the plurality of vehicles on the basis of the driving force reference value; and
   set, as the acceleration command value for the automated driving, a smallest value among the calculated plurality of acceleration estimation values.

5. The automated driving integrated control apparatus according to claim 1, wherein
   the server side transmission processor is further configured to transmit the acceleration command value for the automated driving in a case where a preset number or a larger number of vehicles of the plurality of vehicles that are control targets travel in a row.

6. The automated driving integrated control apparatus according to claim 1, wherein
   the server side transmission processor is further configured to transmit the acceleration command value for the automated driving to a vehicle of the plurality of vehicles traveling in a dedicated lane for the automated driving.

7. The automated driving integrated control apparatus according to claim 1, wherein
   the server side transmission processor is further configured to transmit the acceleration command value for the automated driving by setting a group of vehicles, of the plurality of vehicles, traveling in a lane of a preset section as a group of control targets.

8. The automated driving integrated control apparatus according to claim 1, wherein
   the server side transmission processor is further configured to transmit the acceleration command value for the automated driving by setting a group of vehicles, of the plurality of vehicles, that travel between traffic lights as a group of control targets.

9. The automated driving integrated control apparatus according to claim 1, wherein
   the server side transmission processor is further configured to transmit the acceleration command value for the automated driving by setting a group of vehicles, of the plurality of vehicles, that travel between interchanges or between parking areas as a group of control targets.

10. The automated driving integrated control apparatus according to claim 1, wherein
    the server side transmission processor is further configured to transmit the acceleration command value for the automated driving in a period of time before a vehicle of the plurality of vehicles travels at a constant speed after beginning to move.

11. A vehicle control apparatus, comprising:
    a vehicle side transmission processor configured to transmit vehicle information comprising information of a current position, information of a vehicle velocity, information of a transmission gear ratio, information of a tire diameter, information of a vehicle weight, information of an output characteristic of an engine, and information of at least one of brake specific fuel consumption or brake specific power consumption to an automated driving integrated control apparatus via a wireless communication mechanism;
    a vehicle side reception processor configured to receive an acceleration command value from the automated driving integrated control apparatus; and
    a drive controller configured to control a driving force of a vehicle on a basis of the received acceleration command value.

12. An automated driving integrated control system, comprising:
    an automated driving integrated control apparatus configured to:
       receive vehicle information comprising information of a current position, information of a vehicle velocity, information of a transmission gear ratio, information of a tire diameter, information of a vehicle weight, information of an output characteristic of an engine, and information of at least one of brake specific fuel consumption or brake specific power consumption from each vehicle of a plurality of vehicles;

obtain a driving force reference value on a basis of at least the information of the at least one of the brake specific fuel consumption or the brake specific power consumption in the received vehicle information;

calculate an acceleration command value for an automated driving on a basis of the driving force reference value; and transmit the calculated acceleration command value to each vehicle of the plurality of vehicles; and a vehicle control apparatus configured to:

transmit the vehicle information to the automated driving integrated control apparatus via a wireless communication mechanism;

receive the acceleration command value from the automated driving integrated control apparatus; and control a driving force of the vehicle on a basis of the received acceleration command value.

13. An automated driving integrated control apparatus, comprising:

circuitry configured to:

receive vehicle information comprising information of a current position, information of a vehicle velocity, information of a transmission gear ratio, information of a tire diameter, information of a vehicle weight, information of an output characteristic of an engine, and information of at least one of brake specific fuel consumption or brake specific power consumption from each vehicle of a plurality of vehicle;

obtain a driving force reference value on a basis of at least the information of the at least one of the brake specific fuel consumption or the brake specific power consumption in the received vehicle information;

calculate an acceleration command value for an automated driving on a basis of the driving force reference value; and transmit the calculated acceleration command value to each vehicle of the plurality of vehicles.

14. A vehicle control apparatus, comprising:

circuitry configured to:

transmit vehicle information comprising information of a current position, information of a vehicle velocity, information of a transmission gear ratio, information of a tire diameter, information of a vehicle weight, information of an output characteristic of an engine, and information of at least one of brake specific fuel consumption or brake specific power consumption to an automated driving integrated control apparatus via a wireless communication mechanism;

receive an acceleration command value from the automated driving integrated control apparatus; and control a driving force of a vehicle on a basis of the received acceleration command value.

\* \* \* \* \*